(12) United States Patent
Conover et al.

(10) Patent No.: US 7,759,267 B2
(45) Date of Patent: Jul. 20, 2010

(54) LIGHTWEIGHT COMPOSITE THERMOPLASTIC SHEETS INCLUDING REINFORCING SKINS

(75) Inventors: Amy M. Conover, Lake Orion, MI (US); Scott Davis, Lee, MA (US)

(73) Assignee: Azdel, Inc., Forest, VA (US)

(*) Notice: Subject to any disclaimer, the term of this patent is extended or adjusted under 35 U.S.C. 154(b) by 56 days.

(21) Appl. No.: 11/278,748

(22) Filed: Apr. 5, 2006

(65) Prior Publication Data

US 2007/0238378 A1  Oct. 11, 2007

(51) Int. Cl.
  *B32B 5/26* (2006.01)
  *B28B 5/00* (2006.01)

(52) U.S. Cl. .................. 442/381; 442/59; 442/153; 442/409; 264/171.1; 264/219; 264/239; 264/241; 264/257; 264/258

(58) Field of Classification Search ............. 442/59, 442/381, 409, 150; 264/171.1, 219, 239, 264/241, 257, 258
See application file for complete search history.

(56) References Cited

U.S. PATENT DOCUMENTS

| | | | |
|---|---|---|---|
| 4,615,717 A | 10/1986 | Neubauer et al. | |
| 4,670,331 A | 6/1987 | Radvan et al. | |
| 4,692,375 A | 9/1987 | Neubauer et al. | |
| 4,734,321 A | 3/1988 | Radvan et al. | |
| 4,767,321 A | 8/1988 | Chilva | |
| 4,793,802 A | 12/1988 | Chilva | |
| 4,802,843 A | 2/1989 | Chilva | |
| 4,925,615 A | 5/1990 | Willis et al. | |
| 4,944,843 A | 7/1990 | Wallace et al. | |
| 4,950,532 A | 8/1990 | Das et al. | |
| 4,978,489 A | 12/1990 | Radvan et al. | |
| 5,348,798 A | 9/1994 | Berghuis et al. | |
| 5,643,989 A | 7/1997 | Van De Grampel et al. | |
| 2005/0153120 A1* | 7/2005 | Birrell | 428/298.1 |
| 2005/0215698 A1* | 9/2005 | Raghavendran et al. | 524/494 |
| 2005/0217932 A1* | 10/2005 | Woodman et al. | 181/290 |
| 2006/0244170 A1* | 11/2006 | Brentrup et al. | 264/122 |
| 2007/0269645 A1* | 11/2007 | Raghavendran et al. | 428/292.1 |

FOREIGN PATENT DOCUMENTS

JP  10-16660  * 1/1998

* cited by examiner

*Primary Examiner*—Norca L Torres-Velazquez
(74) *Attorney, Agent, or Firm*—Armstrong Teasdale LLP

(57) ABSTRACT

A multi-layered fiber reinforced sheet for automotive vehicle interior structural components includes, in an exemplary embodiment, a permeable fiber reinforced thermoplastic core layer having a first surface and a second surface. The core layer includes a plurality of reinforcing fibers bonded together with a thermoplastic resin, and has a density of about 0.1 gm/cc to about 1.8 gm/cc. The multi-layered fiber reinforced sheet also includes at least one first reinforcing skin applied to the first surface of the core layer, and at least one second reinforcing skin applied to the second surface of the core layer. Each first and second reinforcing skin includes a matrix of reinforcing fibers and a thermoplastic resin wherein the matrix of reinforcing fibers applied to the first surface are arranged in a bi-directional orientation and the matrix of reinforcing fibers applied to the second surface are arranged in a bi-directional orientation.

13 Claims, 1 Drawing Sheet

LIGHTWEIGHT COMPOSITE THERMOPLASTIC SHEETS INCLUDING REINFORCING SKINS

BACKGROUND OF THE INVENTION

This invention relates generally to lightweight porous fiber reinforced thermoplastic polymer sheets, and more particularly to lightweight porous fiber reinforced thermoplastic polymer sheets that include reinforcing skins.

Lightweight porous fiber reinforced thermoplastic sheets have been described in U.S. Pat. Nos. 4,978,489 and 4,670,331 and are used in numerous and varied applications in the product manufacturing industry because of the ease of molding the fiber reinforced thermoplastic sheets into articles. Known techniques, for example, thermo-stamping, compression molding, vacuum forming, and thermoforming have been used to successfully form articles from fiber reinforced thermoplastic sheets.

Tougher automotive fuel economy standards are requiring an overall vehicle weight reduction to meet these standards. Traditional vehicle seat back systems are made from stamped steel or blow molded plastics. Steel stamping dies are a huge capital investment. Although a steel seat back is thin, the steel material is very dense compared with polymers. Steel seat back can range from about 3 lbs to 6 lbs. The steel seat back is spot welded to the seat frame and structural reinforcements are attached to the corners of the steel seat back to prevent any bending of the steel when a load is applied. Blow molded seat backs are lighter than steel seat backs, but are bulky and can be 50 mm or greater in thickness. Blow molded plastic seat backs are attached mechanically to the seat frame.

BRIEF DESCRIPTION OF THE INVENTION

In one aspect, a multi-layered fiber reinforced sheet for automotive vehicle interior structural components is provided. The multi-layered fiber reinforced sheet includes a permeable fiber reinforced thermoplastic core layer having a first surface and a second surface. The core layer includes a plurality of reinforcing fibers bonded together with a thermoplastic resin, and has a density of about 0.1 gm/cc to about 1.8 gm/cc. The multi-layered fiber reinforced sheet also includes at least one first reinforcing skin applied to the first surface of the core layer, and at least one second reinforcing skin applied to the second surface of the core layer. Each first and second reinforcing skin includes a matrix of reinforcing fibers and a thermoplastic resin wherein the matrix of reinforcing fibers applied to the first surface are arranged in a bi-directional orientation and the matrix of reinforcing fibers applied to the second surface are arranged in a bi-directional orientation.

In another aspect, an automotive vehicle interior structural component formed from a multi-layered fiber reinforced material is provided. The multi-layered fiber reinforced sheet includes a permeable fiber reinforced thermoplastic core layer having a first surface and a second surface. The core layer includes a plurality of reinforcing fibers bonded together with a thermoplastic resin, and has a density of about 0.1 gm/cc to about 1.8 gm/cc. The multi-layered fiber reinforced sheet also includes at least one first reinforcing skin applied to the first surface of the core layer, and at least one second reinforcing skin applied to the second surface of the core layer. Each first and second reinforcing skin includes a matrix of reinforcing fibers and a thermoplastic resin wherein the matrix of reinforcing fibers applied to the first surface are arranged in a bi-directional orientation and the matrix of reinforcing fibers applied to the second surface are arranged in a bi-directional orientation.

In another aspect, a method of making an automotive vehicle interior structural component is provided. The method includes forming a permeable fiber reinforced thermoplastic core layer having a first surface and a second surface. The core layer includes a plurality of reinforcing fibers bonded together with a thermoplastic resin, and has a density of about 0.1 gm/cc to about 1.8 gm/cc. The method also includes positioning at least one first reinforcing skin on the first surface, positioning at least one second reinforcing skin on the second surface, attaching the at least one first reinforcing skin to the first surface, attaching the at least one second reinforcing layer to the second surface to form a multi-layered fiber reinforced sheet, and molding the multi-layered fiber reinforced sheet into a predetermined shape. Each first and second reinforcing skin includes a matrix of reinforcing fibers and a thermoplastic resin wherein the matrix of reinforcing fibers applied to the first surface are arranged in a bi-directional orientation and the matrix of reinforcing fibers applied to the second surface are arranged in a bi-directional orientation.

DETAILED DESCRIPTION OF THE INVENTION

A formable lightweight composite thermoplastic sheet having reinforcing skins for making automotive vehicle interior structural components, for example, seat backs, is described below in detail. The composite thermoplastic sheet can be used to reduce the weight of load bearing interior components up to about 60% without sacrificing strength over known steel designs. The composite sheet can be thermoformed at low pressures which permit cycle times of about 60 seconds or less and mild temperatures of about 160° F. A low pressure forming process utilizes, for example, match mold aluminum tooling instead of a steel stamping press used for known steel designs. The thickness of the composite thermoplastic sheet in one embodiment is about 2 mm to about 10 mm, and in another embodiment about 2 m to about 4 mm, which permits decreased packaging space to a seatback which increases leg room and/or storage space in an automotive vehicle.

Figure 1:
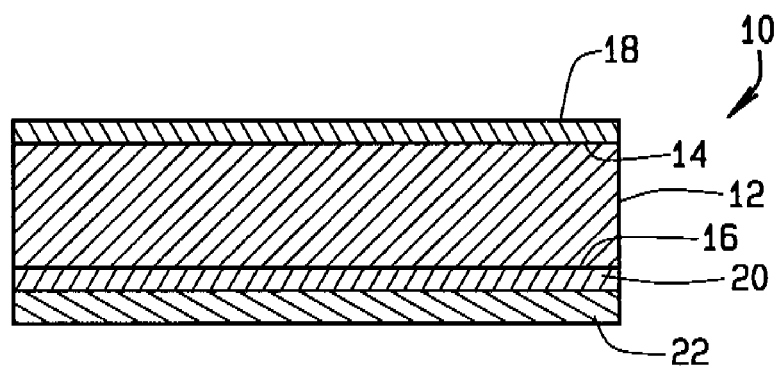
FIG. 1 is a sectional schematic illustration of a composite thermoplastic sheet in accordance with an embodiment of the present invention.

Referring to the drawings, FIG. 1 is a sectional schematic illustration of a lightweight composite thermoplastic sheet 10. In an exemplary embodiment, lightweight composite thermoplastic sheet 10 includes a lightweight porous core 12 having a first surface 14 and a second surface 16. A first reinforcing skin 18 is attached to first surface 14 of core 12. A second reinforcing skin 20 is attached to second surface 16 of core 12. A decorative skin 22 is bonded to second reinforcing skin 20. In alternate embodiments, composite sheet 10 includes decorative skins 22 bonded to first and second reinforcing skins 18 and 20, or no decorative skins.

Core 12 is formed from a web made up of open cell structures formed by random crossing over of reinforcing fibers held together, at least in part, by one or more thermoplastic resins, where the void content of porous core 12 ranges in general between about 1% and about 95% and in particular between about 30% and about 80% of the total volume of core 12. In another embodiment, porous core 12 is made up of open cell structures formed by random crossing over of reinforcing fibers held together, at least in part, by one or more thermoplastic resins, where about 40% to about 100% of the cell structure are open and allow the flow of air and gases through. Core 12 has a density in one embodiment of about 0.1 gm/cc to about 1.8 gm/cc and in another embodiment about 0.3 gm/cc to about 1.0 gm/cc. Core 12 is formed using known manufacturing process, for example, a wet laid process, an air laid process, a dry blend process, a carding and needle process, and other known process that are employed for making non-woven products. Combinations of such manufacturing processes are also useful.

Core 12 includes about 20% to about 80% by weight of reinforcing fibers having an average length of between about 5 mm and about 50 mm, and about 20% to about 80% by weight of a wholly or substantially unconsolidated fibrous or particulate thermoplastic materials, where the weight percentages are based on the total weight of core 12 In another embodiment, core 12 includes about 30% to about 55% by weight of reinforcing fibers. In another embodiment, core 12 includes reinforcing fibers having an average length of between about 5 mm and about 25 mm. Suitable fibers include, but are not limited to metal fibers, metalized inorganic fibers, metalized synthetic fibers, glass fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, coir fibers, and mixtures thereof.

In the exemplary embodiment, reinforcing fibers having an average length of about 5 mm to about 50 mm is added with thermoplastic powder particles, for example polypropylene powder, to an agitated aqueous foam which can contain a surfactant. The components are agitated for a sufficient time to form a dispersed mixture of the reinforcing fibers and thermoplastic powder in the aqueous foam. The dispersed mixture is then laid down on any suitable support structure, for example, a wire mesh, and then the water is evacuated through the support structure forming a web. The web is dried and heated above the softening temperature of the thermoplastic powder. The web is then cooled and pressed to a predetermined thickness to produce composite core 12 having a void content of between about 1 percent to about 95 percent.

The web is heated above the softening temperature of the thermoplastic resins in core 12 to substantially soften the plastic materials and is passed through one or more consolidation devices, for example calendaring rolls, double belt laminators, indexing presses, multiple daylight presses, autoclaves, and other such devices used for lamination and consolidation of sheets and fabrics so that the plastic material can flow and wet out the fibers. The gap between the consolidating elements in the consolidation devices are set to a dimension less than that of the unconsolidated web and greater than that of the web if it were to be fully consolidated, thus allowing the web to expand and remain substantially permeable after passing through the rollers. In one embodiment, the gap is set to a dimension about 5% to about 10% greater than that of the web if it were to be fully consolidated. A fully consolidated web means a web that is fully compressed and substantially void free. A fully consolidated web would have less than 5% void content and have negligible open cell structure.

Particulate plastic materials include short plastics fibers which can be included to enhance the cohesion of the web structure during manufacture. Bonding is affected by utilizing the thermal characteristics of the plastic materials within the web structure. The web structure is heated sufficiently to cause the thermoplastic component to fuse at its surfaces to adjacent particles and fibers.

In one embodiment, individual reinforcing fibers should not on the average be shorter than about 5 millimeters, because shorter fibers do not generally provide adequate reinforcement in the ultimate molded article. Also, reinforcing fibers should not on average be longer than about 50 millimeters since such fibers are difficult to handle in the manufacturing process.

In one embodiment, in order to confer structural strength the reinforcing fibers have an average diameter between about 7 and about 22 microns. Fibers of diameter less than about 7 microns can easily become airborne and can cause environmental health and safety issues. Fibers of diameter greater than about 22 microns are difficult to handle in manufacturing processes and do not efficiently reinforce the plastics matrix after molding.

In one embodiment, the thermoplastics material used to form core 12 is, at least in part, in a particulate form. Suitable thermoplastics include, but are not limited to, polyolefins, including polymethylene, polyethylene, and polypropylene, polystyrene, acrylonitrylstyrene, butadiene, polyesters, including polyethyleneterephthalate, polybutyleneterephthalate, and polypropyleneterephthalate, polybutyleneterachlorate, and polyvinyl chloride, both plasticised and unplasticised, acrylics, including polymethyl methacrylate, and blends of these materials with each other or other polymeric materials. Other suitable thermoplastics include, but are not limited to, polyarylene ethers, acrylonitrile-butylacrylate-styrene polymers, amorphous nylon, as well as alloys and blends of these materials with each other or other polymeric materials. It is anticipated that any thermoplastics resin can be used which is not chemically attacked by water and which can be sufficiently softened by heat to permit fusing and/or molding without being chemically or thermally decomposed.

The thermoplastic particles need not be excessively fine, but particles coarser than about 1.5 millimeters are unsatisfactory in that they do not flow sufficiently during the molding process to produce a homogenous structure. The use of larger particles can result in a reduction in the flexural modulus of the material when consolidated.

Figure 2:
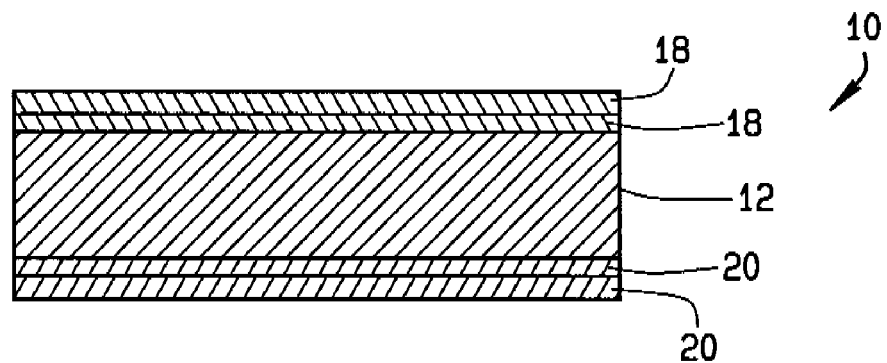
FIG. 2 is a sectional schematic illustration of a composite thermoplastic sheet in accordance with another embodiment of the present invention.
Figure 3:
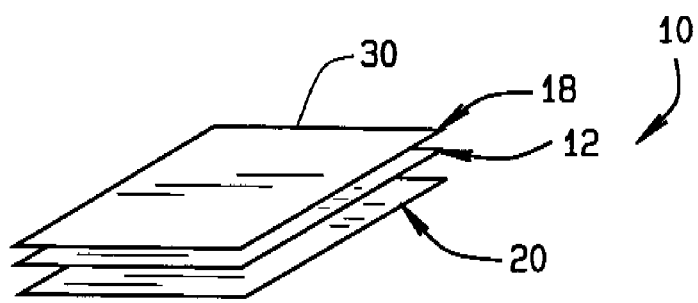
FIG. 3 is an exploded perspective schematic illustration of the composite thermoplastic sheet shown in FIG. 1.

Referring also to FIGS. 2 and 3, first reinforcing skin 18 includes a matrix 30 of reinforcing fibers bonded together by a thermoplastic resin. The reinforcing fibers are arranged in a bi-directional orientation. Similarly, second reinforcing skin 20 includes a matrix 32 of reinforcing fibers bonded together in a bi-directional orientation. By bi-directional orientation is meant that the longitudinal axis of at least some of the reinforcing fibers is not parallel to the longitudinal axis of the remaining reinforcing fibers. The reinforcing fibers can be at 90°, 45°, 30°, and the like, from each other. The reinforcing fibers can be in a woven configuration or a knit configuration. If the reinforcing fibers are in a unidirectional orientation in first reinforcing skin 18, another first reinforcing skin 18 with reinforcing fibers in a unidirectional orientation is applied and positioned so that the reinforcing fibers in the additional reinforcing skin 18 is at an angle to the first reinforcing skin 18, thereby creating a matrix of reinforcing fibers that are bi-directional. Similarly, more than one second reinforcing skin 20 with unidirectionally orientated reinforcing fibers is used to form a matrix of reinforcing fibers with a bi-directional orientation. In alternate embodiments, a plurality of first reinforcing skins 18 with unidirectional reinforcing fibers are used to form the matrix of reinforcing fibers in a bi-directional orientation, and a plurality of second reinforcing skins 20 with unidirectional reinforcing fibers are used to form the matrix of reinforcing fibers in a bi-directional orientation.

The reinforcing fibers described above that are suitable for use in making core layer 12 are also suitable in reinforcing skins 18 and 20. Similarly, the thermoplastic resins described above that are suitable for core layer 12 are also suitable in reinforcing skins 18 and 20. Reinforcing skins 18 and 20 can be attached to core layer 12 during the manufacturing process of core layer 12 or reinforcing skins 18 and 20 an be attached prior to forming a automotive vehicle structural component, for example, a seat back. Reinforcing skins 18 and 20 can be laminated to core 12, sonic welded to core 12, or simply laid across core 12 before the structural component forming process.

In one exemplary embodiment, to form a vehicle structural component, composite thermoplastic sheet 10 is heated to a temperature sufficient to melt the thermoplastic resin. Heated composite thermoplastic sheet 10 is positioned in a mold, for example a matched aluminum mold, heated to about 160° F. and stamped into the desired shape using a low pressure press. In other embodiments, composite thermoplastic sheet 10 can be molded into various automotive vehicle interior structural components using any method known in the art including, for example, thermal forming, thermal stamping, vacuum forming, compression forming, and autoclaving.

In another embodiment, decorative layer 22 is applied to second reinforcing skin 20 by any known technique, for example, lamination, adhesive bonding, and the like. Decorative layer 22 is formed from a thermoplastic film of, for example, polyvinyl chloride, polyolefin, thermoplastic polyester, thermoplastic elastomer, or the like. In another embodiment, decorative layer 22 is a multilayered structure that includes a foam core formed from, for example, polypropylene, polyethylene, polyvinyl chloride, polyurethane, and the like. A fabric is bonded to the foam core, for example, woven fabrics made from natural and synthetic fibers, organic fiber nonwoven fabric after needle punching or the like, raised fabric, knitted goods, flocked fabric and the like. In another embodiment the fabric is bonded to the foam core with a thermoplastic adhesive, including pressure sensitive adhesives and hot melt adhesives, for example, polyamides, modified polyolefins, urethanes and polyolefins.

While the invention has been described in terms of various specific embodiments, those skilled in the art will recognize that the invention can be practiced with modification within the spirit and scope of the claims.

What is claimed is:

1. An automotive vehicle interior structural component comprising a molded multi-layered fiber reinforced material, said multi-layered fiber reinforced material comprising:
    a permeable fiber reinforced thermoplastic core layer comprising a plurality of reinforcing fibers bonded together with a thermoplastic resin, said permeable core layer having a density of about 0.1 gm/cc to about 1.8 gm/cc and comprising a first surface and a second surface;
    two first reinforcing skins applied to said first surface, each said first reinforcing skin comprising a matrix of reinforcing fibers and a thermoplastic resin, said reinforcing fibers of each of said first reinforcing skins are unidirectional with said longitudinal axis of said reinforcing fibers orientated in one direction, said two first reinforcing skins are positioned so that said longitudinal axis of said reinforcing fibers of one of said first reinforcing skins is at an angle to said longitudinal axis of the other one of said first reinforcing skins creating a bi-directional orientation of said reinforcing fibers of said first reinforcing skins; and
    at least one second reinforcing skin applied to said second surface;
    each said second reinforcing skin comprising a matrix of reinforcing fibers and a thermoplastic resin wherein said matrix of reinforcing fibers applied to said second surface are arranged in a bi-directional orientation with at least a portion of said reinforcing fibers are unidirectional and are orientated so that a longitudinal axis of said portion of said reinforcing fibers are at an angle to a longitudinal axis of a remaining portion of unidirectional reinforcing fibers;
    said multi-layered fiber reinforced material molded at a temperature of about 160° F. and a molding cycle time of about 60 seconds of less.

2. A structural component in accordance with claim 1 wherein said multi-layered fiber reinforced material comprises two second reinforcing skins wherein said reinforcing fibers of each of said second reinforcing skins are unidirectional with said longitudinal axis of said reinforcing fibers orientated in one direction, said two second reinforcing skins are positioned so that said longitudinal axis of said reinforcing fibers of one of said second reinforcing skins is at an angle to said longitudinal axis of the other one of said second reinforcing skins creating a bi-directional orientation of said reinforcing fibers of said second reinforcing skins.

3. A structural component in accordance with claim 1 wherein each said first and second reinforcing skin comprises between about 50 weight percent and about 80 weight percent of reinforcing fibers.

4. A structural component in accordance with claim 1 wherein said core layer comprises about 20 weight percent to about 80 weight percent reinforcing fibers.

5. A structural component in accordance with claim 1 wherein said reinforcing fibers in said core and said first and second reinforcing skins comprise at least one of metal fibers, metalized inorganic fibers, metalized synthetic fibers, glass fibers, polyester fibers, polyamide fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, and coir fibers.

6. A structural component in accordance with claim 1 wherein said thermoplastic resin in said core and saidfirst and second reinforcing skins comprise at least one of polyolefins, polyamides, polystyrene, acrylonitrylstyrene, butadiene, polyesters, polybutyleneterachlorate, polyvinyl chloride, polyphenylene ether, polyphenylene oxide, polyether imide, polycarbonates, polyestercarbonates, acrylonitrile-butylacrylate-styrene polymers, polybutyleneterephthalate, polyethyleneteraphthalate, and amorphous nylon.

7. A structural component in accordance with claim 1 further comprising a decorative layer applied to an outer surface of at least one of said first at least one reinforcing skin and said second at least one reinforcing skin.

8. A method of making an automotive vehicle interior structural component, said method comprising:
    forming a permeable fiber reinforced thermoplastic core layer comprising a plurality of reinforcing fibers bonded together with a thermoplastic resin, the permeable core layer having a density of about 0.1 gm/cc to about 1.8 gm/cc and having a first surface and a second surface;
    positioning two first reinforcing skin on the first surface, each first reinforcing skin comprising a matrix of reinforcing fibers and a thermoplastic resin, the reinforcing fibers of each of the first reinforcing skins are unidirectional with the longitudinal axis of the reinforcing fibers orientated in one direction, the two first reinforcing skins are positioned so that the longitudinal axis of the reinforcing fibers of one of the first reinforcing skins is at an angle to the longitudinal axis of the other one of the first reinforcing skins creating a bi-directional orientation of the reinforcing fibers of the first reinforcing skins;

positioning at least one second reinforcing skin on the second surface;

attaching the first reinforcing skins to the first surface;

attaching the at least one second reinforcing layer to the second surface to form a multi-layered fiber reinforced sheet; and molding the multi-layered fiber reinforced sheet into a predetermined shape at a molding temperature of about 160° F. and a molding cycling time of about 60 seconds or less;

each second reinforcing skin comprising a matrix of reinforcing fibers and a thermoplastic resin wherein the matrix of reinforcing fibers applied to the second surface are arranged in a bi-directional orientation with at least a portion of the reinforcing fibers are unidirectional and are orientated so that a longitudinal axis of the portion of the reinforcing fibers are at an angle to a longitudinal axis of a remaining portion of unidirectional reinforcing fibers.

9. A method in accordance with claim 8 wherein the multi-layered fiber reinforced sheet comprises two second reinforcing skins wherein said reinforcing fibers of each of said second reinforcing skins are unidirectional with said longitudinal axis of said reinforcing fibers orientated in one direction, said two second reinforcing skins are positioned so that said longitudinal axis of said reinforcing fibers of one of said second reinforcing skins is at an angle to said longitudinal axis of the other one of said second reinforcing skins creating a bi-directional orientation of said reinforcing fibers of said second reinforcing skins.

10. A method in accordance with claim 8 wherein each first and second reinforcing skin comprises between about 50 weight percent and about 80 weight percent of reinforcing fibers.

11. A method in accordance with claim 8 wherein the core layer comprises about 20 weight percent to about 80 weight percent reinforcing fibers.

12. A method in accordance with claim 8 wherein said reinforcing fibers in said core and said first and second reinforcing skins comprise at least one of metal fibers, metalized inorganic fibers, metalized synthetic fibers, glass fibers, polyester fibers, polyamide fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, and coir fibers.

13. A method in accordance with claim 8 further comprising bonding at least one decorative layer to the multi-layered fiber reinforced sheet.

* * * * *